(12) United States Patent
Fra' et al.

(10) Patent No.: US 8,484,185 B2
(45) Date of Patent: Jul. 9, 2013

(54) CONTEXT-BASED COMMUNICATION SERVICE

(75) Inventors: Cristina Fra', Turin (IT); Massimo Valla, Turin (IT)

(73) Assignee: Telecom Italia S.p.A., Milan (IT)

( * ) Notice: Subject to any disclaimer, the term of this patent is extended or adjusted under 35 U.S.C. 154(b) by 66 days.

(21) Appl. No.: 13/142,571

(22) PCT Filed: Dec. 30, 2008

(86) PCT No.: PCT/EP2008/068349
§ 371 (c)(1),
(2), (4) Date: Jun. 28, 2011

(87) PCT Pub. No.: WO2010/075883
PCT Pub. Date: Jul. 8, 2010

(65) Prior Publication Data
US 2011/0271287 A1    Nov. 3, 2011

(51) Int. Cl.
*G06F 17/30* (2006.01)
(52) U.S. Cl.
USPC .......................................................... 707/706
(58) Field of Classification Search
USPC ................... 707/2, 3, 706; 718/108; 455/433
See application file for complete search history.

(56) References Cited

U.S. PATENT DOCUMENTS 7,383,253 B1    6/2008  Tsimelzon et al.
2002/0090943 A1*  7/2002  Kwon ............................ 455/433
2004/0165577 A1   8/2004  Ahn
2004/0267769 A1   12/2004 Galindo-Legaria et al.
2005/0071322 A1   3/2005  Chen et al.

FOREIGN PATENT DOCUMENTS

EP         1 450 519 A2        8/2004
WO       WO-00/77690 A1       12/2000
WO       WO-03/027901 A1       4/2003

OTHER PUBLICATIONS

International Search Report from the European Patent Office for International Application No. PCT/EP2008/068349 (Mail date Apr. 6, 2009).

\* cited by examiner

*Primary Examiner* — Etienne LeRoux
(74) *Attorney, Agent, or Firm* — Finnegan, Henderson, Farabow, Garrett & Dunner, L.L.P.

(57) ABSTRACT

Providing a context-based service to a terminal, including: a) receiving a query from a service application, the query indicating that a context server should perform an action when a query condition is fulfilled, the query condition referring to one or more attributes of derived context information indicative of a context of the terminal; b) generating a query evaluation trigger indicating that the query condition should be evaluated; c) identifying raw context information to derive the derived context information; d) generating a calculation trigger indicating that the derived context information should be calculated when the raw context information is updated; e) receiving an update of the raw context information and, according to the calculation trigger, calculating a new value of the derived context information; and f) according to the query evaluation trigger, evaluating the query condition by using the new value and, if the query condition is fulfilled, performing the action.

15 Claims, 2 Drawing Sheets

CONTEXT-BASED COMMUNICATION SERVICE

CROSS REFERENCE TO RELATED APPLICATION

This application is a national phase application based on PCT/EP2008/068349, filed Dec. 30, 2008, the content of which is incorporated herein by reference.

TECHNICAL FIELD

The present invention relates to the field of communication services. In particular, the present invention relates to a method for providing a context-based service to a terminal of a communication network. Further, the present invention relates to a context server and a communication system configured to implement the above method.

BACKGROUND ART

It is known that communication networks allow to provide users with a number of data services (for instance, Internet access, e-mail, exchange of messages, video-on-demand) and/or telephone services (for instance, calls and conference calls).

A user may access such services by means of a terminal, which can be either a fixed terminal (i.e. a terminal which is connected to the communication network distributing the services through a wired connection) or a mobile terminal (i.e. a terminal which is connected to the communication network distributing the services through a wireless connection). Exemplary mobile terminals are the GSM (Global System for Mobile communications) or UMTS (Universal Mobile Telecommunication System) mobiles and the laptop computers provided with a GSM or UMTS interface, or with a Bluetooth or Wi-Fi interface.

A terminal (in particular, a mobile terminal) is frequently equipped with a number of sensors allowing to detect context information about the terminal. In the following description and in the claims, the expression "context information about a terminal" will designate a set of information indicative of the context (i.e. the environment and/or the operating status) in which the terminal is put. Exemplary context information are:

- the terrestrial coordinates at which the terminal is located, which may be detected e.g. by a GPS device installed on the terminal;
- the identifier of the mobile cell the device is connected to, which may be detected by any GSM or UMTS mobile;
- the luminosity and/or the temperature and/or the humidity of the environment surrounding the terminal, which can be detected by suitable sensors installed on the terminal;
- the acceleration to which the terminal is subjected, which can be detected by an accelerometer installed on the terminal;
- the presence of a Wi-Fi hotspot in the environment surrounding the terminal, which can be detected by a Wi-Fi interface installed on the terminal; and
- the presence of Bluetooth devices in the environment surrounding the terminal, which can be detected by a Bluetooth interface installed on the terminal.

Service providers are able to collect context information from the terminals of their users, and to process them for providing data services and telephone services which are capable of adapting themselves to the context of the terminals. In the following description and in the claims, the expression "context-based service" will designate a data service or a telephone service which is capable of acquiring context information from a terminal and to use such context information for adapting itself to the context of the terminal.

U.S. Pat. No. 7,383,253 discloses a Continuous Query Processor that processes queries on continuously updating data sources or data streams and includes a Publication Manager for accepting published structured elements of data from data stream Publishers, a Subscription Manager for giving structured elements of data to one or more data stream Subscribers, a Query Module Manager for processing queries represented by Query Modules, a Query Module Store for maintaining deployed Query Modules, a Query Primitive Manager performing processing for various primitives that comprise a Query Module, and a Schedule Manager for coordinating when a primitive within a Query Module gets processed in order to maintain that each continuous query is continuously updated immediately upon the arrival of structured element data affecting any part of a continuous query.

US 2005/071322 discloses a concept called virtual construct intervals (VCI), where each predicate interval is decomposed into one or more of these construct intervals. These VCIs strictly cover the predicate interval. Namely, every attribute value covered by the predicate interval is also covered by at least one of the decomposed VCIs, and vice versa. Each construct interval has a unique ID or interval coordinate and a set of endpoints. A construct interval is considered activated when a predicate interval using it in its decomposition is added to the system. The predicate ID is then inserted into the ID lists associated with the decomposed VCIs. To facilitate fast search, a bitmap vector is used to indicate the activation of VCIs that cover an event value. The challenge is to find an appropriate set of construct intervals to make predicate decomposition simple and, more importantly, to build efficient bitmap indexes. Because each construct interval covers only a small range of attribute values, the invention also uses bitmap clipping to cut unnecessary bitmap storage. To facilitate bitmap clipping, the invention introduce the covering segment concept. Bit positions outside a covering segment are pruned.

US 2004/267769 discloses a systems and methods to increase the scalability of subscriptions in an electronic database environment. In an illustrative implementation, a computing application comprises at least one instruction set to cooperate with a data environment to optimise the processing of subscriptions by the data environment when communicating with cooperating services and/or applications. In operation, a subscription is identified. A subscription template is created for the subscription and the subscription template is parameterised to create a parameter table containing parameters (e.g. subscription constants). A join is then performed between the parameters of the parameter table and the parameterised subscription templates to generate application and/or service data required by the cooperating services and/or applications. The data is then processed by the applications and/or services.

SUMMARY OF THE INVENTION

In the following description and in the claims, the expression "raw context information" will designate context information that the terminal is capable of detecting. Exemplary raw context information may be for instance the above mentioned terrestrial coordinates, identifier of the mobile cell, identifier of the Wi-Fi hotspot, and identifiers of Bluetooth devices. Further exemplary raw context information may be for instance a list of Bluetooth devices located in proximity of a given terminal.

On the other hand, in the following description and in the claims, the expression "derived context information" will designate context information derived by suitably processing raw context information. Exemplary derived context information that may be derived from the above mentioned terrestrial coordinates is the address at which the terminal is located. Indeed, the address can not be directly provided by the terminal itself, but can be derived by suitably processing terrestrial coordinates provided by the terminal. Besides that, exemplary derived context information that may be derived from the above mentioned list of Bluetooth devices located in proximity of a given terminal is a list of users located in proximity of the terminal. Indeed, also in this case, the list of users cannot be directly provided by the terminal itself, but can be derived by suitably processing the list of Bluetooth devices provided by the terminal.

Derived context information may be formed by different attributes. For instance, the derived context information address may comprise at least three attributes: city, street and street number. On the other hand, for instance, in the above mentioned list of users located in proximity of the terminal, the identifier of each user is an attribute of the derived context information.

A context-based service may be suitable for adapting itself to raw context information about the terminal. For instance, a context-based service may provide transmission of tourist information to the terminal when the terminal enters the coverage area of a given Wi-Fi hotspot (e.g., a Wi-Fi hotspot located in a museum).

Besides, a context-based service may be suitable for adapting itself to one or more attributes of derived context information about the terminal. For instance, a context-based service may allow the user defining a list of other users (e.g., his/her friends) and, while the user with his/her terminal is located in a given city (e.g. a city different from his/her residence city), being notified when the terminals of one or more of such other users are located in proximity of his/her terminal. This exemplary context-based service is therefore suitable for adapting itself to a single attribute (i.e. city) of derived context information (i.e. address).

The Applicant has faced the problem of providing a method for providing a context-based service to a terminal of a communication network, which is capable of providing a context-based service suitable for adapting itself to one or more attributes of derived context information about the terminal.

According to a first aspect, it is provided a method for providing a context-based service to a terminal of a communication network, the method comprising, at a context server cooperating with the communication network:
  a) receiving a query from a service application suitable for implementing the context based service, the query indicating that the context server should perform an action when a query condition is fulfilled, the query condition referring to one or more attributes of derived context information indicative of a context of the terminal;
  b) generating a query evaluation trigger indicating that the query condition should be evaluated when the derived context information is updated;
  c) identifying raw context information allowing to derive the derived context information;
  d) generating a calculation trigger indicating that the derived context information should be calculated when an update of the raw context information is received from the terminal;
  e) receiving from the terminal an update of the raw context information and, according to the calculation trigger, calculating a new value of the derived context information according to the update; and
  f) according to the query evaluation trigger, evaluating the query condition by using the new value and, if the query condition is fulfilled, performing the action.

The step c) may comprise identifying the raw context information as raw context information whose variation may determine a variation of the one or more attributes referred to by the query condition.

In one embodiment:
  the step c) comprises identifying further raw context information allowing to derive the derived context information; and
  the step d) comprises generating a further calculation trigger indicating that the derived context information should be calculated also when an update of the further raw context information is received from the terminal.

Step e) may comprise, after calculating the new value of the derived context information, storing the new value in a context database cooperating with the context server, the context database also storing a previously stored value of the derived context information.

Step e) may further comprise comparing the new value with the stored value and, if the new value is equal to the stored value, deciding not to perform step f).

In one embodiment, step e) further comprises removing the previously stored value of the derived context information from the context database upon reception of the update.

In one embodiment, step e) further comprises removing the previously stored value of the derived context information from the context database upon expiration of an expiry time.

According to a second aspect, the present invention provides a context server for a communication network, the context server being configured to provide a context-based service to a terminal of the communication network, the context server comprising:
  a query processor configured to:
    a) receive a query from a service application suitable for implementing the context based service, the query indicating that the context server should perform an action when a query condition is fulfilled, the query condition referring to one or more attributes of derived context information indicative of a context of the terminal;
    b) generate a query evaluation trigger indicating that the query condition should be evaluated when the derived context information is updated;
    c) identify raw context information allowing to derive the derived context information; and
    d) generate a calculation trigger indicating that the derived context information should be calculated when an update of the raw context information is received from the terminal; and
  a trigger processor configured to:
    e) receive from the terminal an update of the raw context information and, according to the calculation trigger, calculate a new value of the derived context information according to the update; and
    f) according to the query evaluation trigger, evaluate the query condition by using the new value and, if the query condition is fulfilled, performing the action.

The query processor is preferably configured to identifying the raw context information as raw context information whose variation may determine a variation of the one or more attributes referred to by the query condition.

In one embodiment, the query processor is configured to identify the raw context information by invoking a derived context provider cooperating with the context server.

The context server may further comprise a context database suitable for storing a previously stored value of the derived context information. Preferably, the trigger processor is further configured to, after calculating the new value of the derived context information, store the new value in the context database.

In one embodiment, the trigger processor is further configured to compare the new value with the stored value and, if the new value is equal to the stored value, decide not to evaluate the query condition by using the new value.

In one embodiment the trigger processor is further configured to remove the previously stored value of the derived context information from the context database upon reception of the update.

The trigger processor may be further configured to remove the previously stored value of the derived context information from the context database upon expiration of an expiry time.

According to a further aspect, the present invention provides a communication system comprising a communication network and a context server cooperating with the communication network, the context server being configured to provide a context-based service to a terminal of the communication network, wherein the context server is as set forth above.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
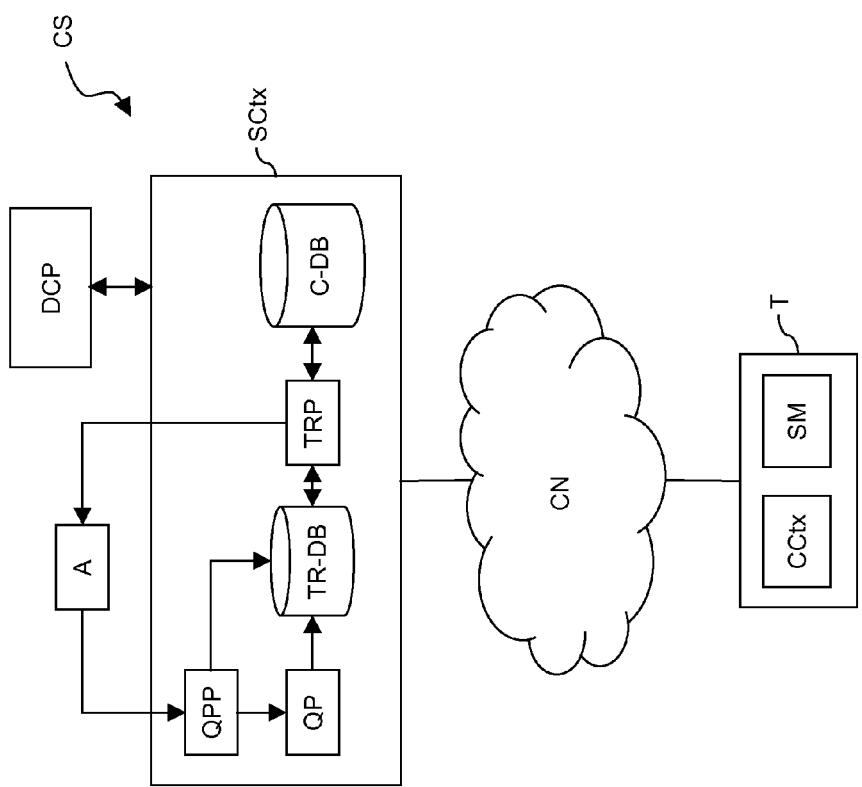
FIG. 1 schematically shows a communication system suitable for implementing the method according to an embodiment of the present invention.

FIG. 1 schematically shows a communication system CS suitable for implementing the method according to embodiments of the present invention.

The communication system CS comprises a communication network CN. For instance, the communication network CN may comprise a mobile access network such as a GSM or UMTS network and/or a transport packet-switched network such as an Internet network.

Further, the communication system CS comprises a context server SCtx and a service application A.

The service application A is suitable for implementing (when activated) a context-based service by cooperating with the context server SCtx, as it will be described in further detail herein after. Optionally, the service application A may be included in the context server SCtx. For instance, it may be a configuration application which is automatically activated at the context server SCtx when a given event occurs in the communication system CS (e.g., a new terminal is connected to the communication network CN).

The context server SCtx is suitable for cooperating with the service application A. According to embodiments of the present invention, the context server SCtx comprises a query pre-processor QPP, a query processor QP, a trigger database TR-DB, a trigger processor TRP, and a context database C-DB. The roles of the various components of the context server SCtx will be explained in detail herein after.

Furthermore, the communication system CS comprises at least one derived context provider DCP, which is suitable for cooperating with the context server SCtx. More particularly, the derived context provider DCP is suitable for receiving raw context information from the context server SCtx, for processing them for calculating derived context information and for transmitting the derived context information to the context server SCtx, as it will be described in further detail herein after.

Further, the communication system CS comprises a terminal T, by means of which a user may access the context-based service implemented by the service application A. According to embodiments of the present invention, the terminal T cooperates with a sensor module SM, which includes one or more sensors suitable for detecting raw context information relating to the terminal T. In FIG. 1, the sensor module SM is represented as included in the terminal T. However, according to other embodiments not shown in the drawings, the sensor module SM may be external to the terminal T. Moreover, the terminal T comprises a context client CCtx, which is suitable for cooperating with the context server SCtx, for providing the context server SCtx with raw context information detected by the sensor module SM.

The operation of the communication system CS according to an embodiment of the present invention will be now described in detail, under the assumption that the user of the terminal T requests to access the context-based service implemented by the service application A. For instance, the context-based service implemented by the service application A may be the above mentioned service that allows the user defining a list of other users (e.g., his/her friends) and, while the user with his/her terminal is located in a given city (e.g. a city different from his/her residence city), being notified when the terminals of one or more of such other users are located in proximity of his/her terminal.

According to first variants, the service application A is activated when the user requests to access the context-based service. According to other variants, the service application A is activated at the request of the context server SCtx.

Figure 2:
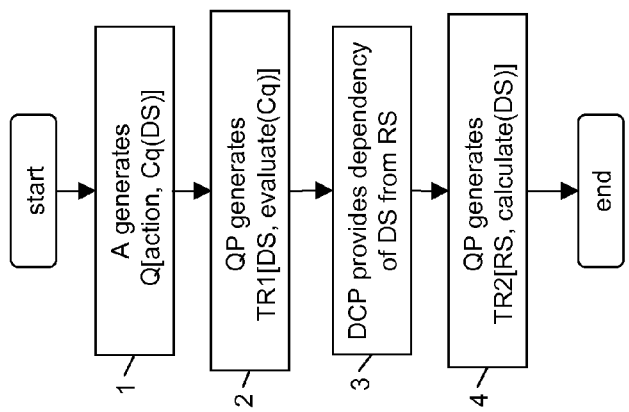
FIG. 2 is a flow chart schematically showing the operation of the communication system of FIG. 1, when a query is received from a service application.

With reference to the flow chart of FIG. 2, when the service application A is activated, it generates a query Q[action, Cq(DS)] (step 1). The query Q[action, Cq(DS)] indicates that, for implementing the context-based service, the service application A needs the context server SCtx to perform a given action (in the above exemplary context based service, the context server SCtx should provide the service application A with the identifiers of users whose terminals are located in proximity of the terminal T) when a query condition Cq is fulfilled.

The query condition Cq relates to one or more attributes of derived context information DS about the terminal T. For instance, the query condition Cq may be a change of one or more attributes of the derived context information DS, or the equality of such one or more attributes to a predefined value. For instance, by referring to the above exemplary context-based service, the derived context information DS is the address, and the query condition Cq relates only to a single attribute of the address (i.e. the city), the query condition Cq being a inequality between the city where the terminal T is currently located and the residence city of the user.

The query Q[action, Cq(DS)] preferably also comprises an identifier of the terminal T, since the communication system CS of FIG. 1 generally comprises various terminals, and therefore the application A has to specify the terminal to which the query relates. For simplicity, in the following description, the identifier of the terminal T will be omitted.

The query Q[action, Cq(DS)] is received by the context server SCtx, which preferably processes it by means of its query pre-processor QPP. The query pre-processor QPP preferably validates the query Q[action, Cq(DS)] (step not shown in FIG. 2).

Upon completion of pre-processing, the query Q[action, Cq(DS)] is forwarded to the query processor QP, that generates a query evaluation trigger TR1[DS, evaluate(Cq)] associated to the query Q[action, Cq(DS)] (step 2). The query evaluation trigger TR1[DS, evaluate(Cq)] indicates that, for allowing the service application A to operate in a correct way, the context server SCtx should evaluate the query condition Cq (i.e. check whether it is fulfilled or not) and react accordingly (i.e. perform the action specified in the query when the query condition Cq is fulfilled) each time an update of the derived context information DS is received. The query evaluation trigger TR1[DS, evaluate(Cq)] is then stored in the trigger database TR-DB.

Then, according to embodiments of the present invention, the query processor QP invokes the derived context provider DCP for retrieving possible dependencies of the derived context information DS referred to by the query condition Cq from raw context information RS (step 3).

Preferably, the derived context provider DCP selects, among all the raw context information impacting on the derived context information DS, only the raw context information RS whose variations could determine a variation of the one or more attributes actually referred to by the query condition Cq.

By referring to the exemplary context-based service, variations of the address may be indicated by variations of raw context information such as: the terrestrial coordinates and/or the mobile cell's identifier and/or the identifiers of the Bluetooth devices detected by the Bluetooth interface of the terminal T and/or the identifier of the Wi-Fi hotspot detected by the Wi-Fi interface of the terminal T. However, when the identifiers of the Bluetooth devices detected by the Bluetooth interface of the terminal T change, this is typically not determined by a variation of the city where the terminal T is located. This is due to the fact that the coverage area of a Bluetooth device typically is of some tens of meters. Variations of the identifiers of the Bluetooth devices detected by the Bluetooth interface are therefore typically determined by a variation of the position of the terminal T within the same building at the same street number, or within a same street. The same considerations apply also to changes of the identifier of the Wi-Fi hotspot detected by the Wi-Fi interface of the terminal T.

On the other hand, when the mobile cell's identifier or the terrestrial coordinates change, this may indicate a change of city.

Therefore, when evaluating changes of city, the identifiers of the Bluetooth devices detected by the Bluetooth interface of the terminal T and/or the identifier of the Wi-Fi hotspot detected by the Wi-Fi interface of the terminal T are preferably disregarded, since variations of such raw context information do not indicate variations of city. On the other hand, the mobile cell's identifier are preferably taken into account, since variations of such raw context information may indicate variations of city. As to the terrestrial coordinates, they should also be taken into account, since also variations of such raw context information may indicate variations of the city.

After selection of the raw context information RS by the derived context provider DCP, the query processor QP generates a calculation trigger TR2[RS, calculate(DS)] (step 4). The calculation trigger TR2[RS, calculate(DS)] indicates that the derived context information DS referred to by the query condition Cq should be calculated each time an update on the raw context information RS selected by the derived context provider DCP is received from the terminal T at the context server SCtx.

For instance, by referring to the exemplary context-based service, by assuming that during step 3 the derived context provider DCP has selected only the terrestrial coordinates as raw context information RS, the query processor QP may generate a calculation trigger TR2[RS, calculate(DS)] indicating that the derived context provider DCP should calculate the address each time an update of the terrestrial coordinates is received at the context server SCtx.

Therefore, the value of the derived context information DS (i.e. the address) is advantageously calculated only upon reception of updates of raw context information RS (i.e. the terrestrial coordinates) that may impact on the attribute city, while avoiding to calculate it upon reception of updates of any other raw context information transmitted by the terminal T (i.e. identifiers of Bluetooth devices or identifier of Wi-Fi hotspot) that, according to the information provided by the derived context provider DCP, are not going to impact the attribute city.

Preferably, in case the derived context provider DCP selects more than one raw context information RS, during step 4 the query processor QP generates a separate calculation trigger for each selected raw context information. For instance, by referring to the above exemplary context-based service, if the derived context provider DCP selects both the terrestrial coordinates and the identifier of the mobile cell as raw context information RS, then the query processor QP may generate a first calculation trigger indicating that the address should be recalculated when updates of the terrestrial coordinates are received, and a second calculation trigger indicating that the address should be recalculated when updates of the mobile cell's identifier are received.

The calculation trigger(s) generated during step 4 are then stored in the trigger database TR-DB.

After generation of the query evaluation trigger TR1[DS, evaluate(Cq)] and of the calculation trigger(s) TR2[RS, calculate(DS)], the context server SCtx awaits for possible updates of raw context information transmitted by the terminal T.

It is assumed that the terminal T sends updates of all the raw context information to the context server SCtx either periodically or each time any of such raw context information changes value. Therefore, by referring to the above exemplary context-based service, the terminal T sends an update of the detected terrestrial coordinates, of the mobile cell's identifier, of the Wi-Fi hotspot identifier and of the Bluetooth device identifiers each time any of these varies.

Figure 3:
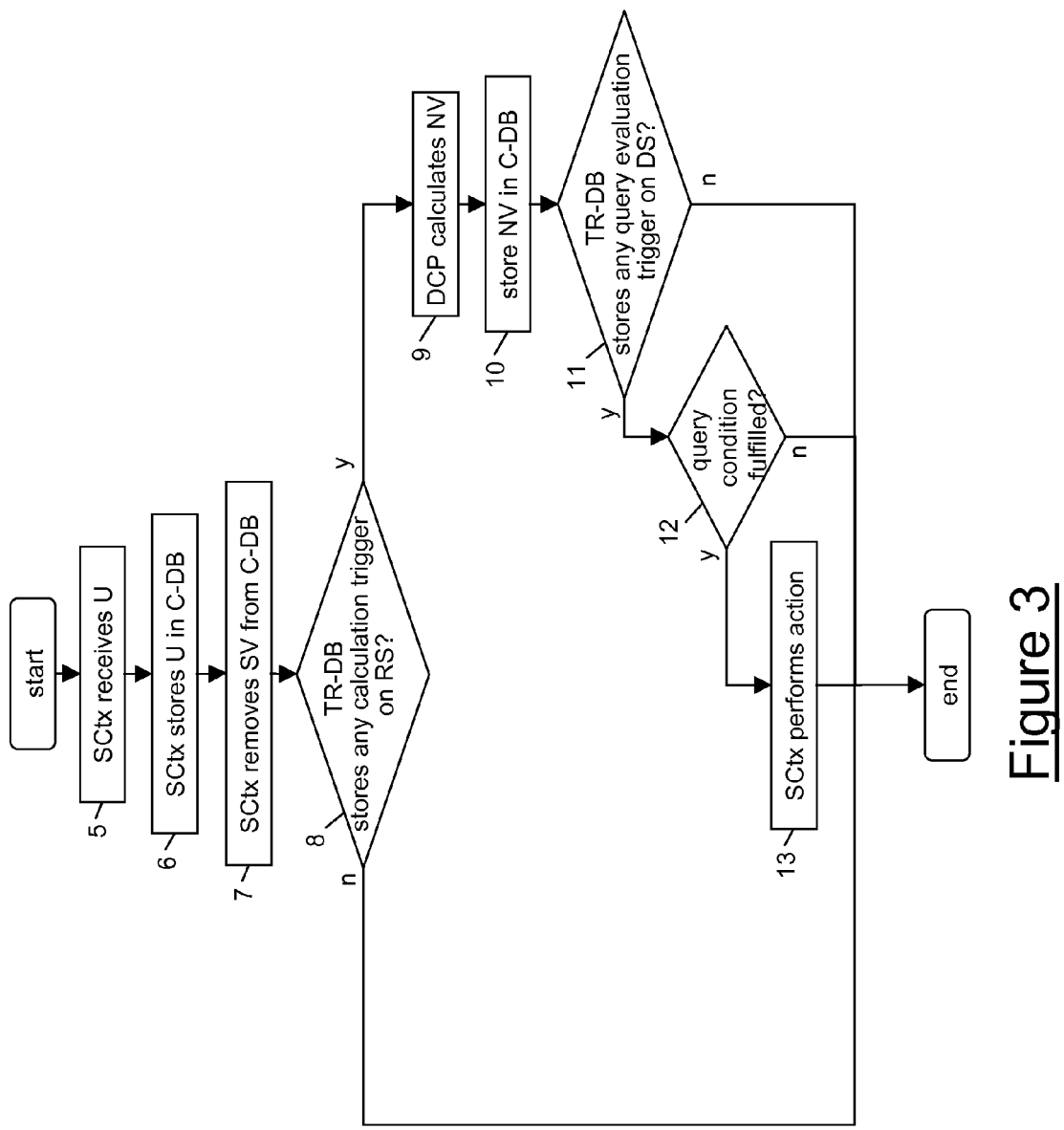
FIG. 3 is flow chart schematically showing the operation of the communication system of FIG. 1, when an update of raw context information is received from a terminal.

By referring now to the flow chart of FIG. 3, when the terminal T transmits an update U of raw context information, according to embodiments of the present invention, the context server SCtx receives it by means of its trigger processor TRP (step 5). Preferably, the trigger processor TRP then stores the update U in the context database C-DB (step 6).

Then, the trigger processor TRP invokes the derived context provider DCP, that in turn provides it with the derived context information that depend on the raw context information whose update U has been received. For instance, by referring to the above exemplary context-based service, if an update U of the Wi-Fi hotspot identifier is received, the derived context provider DCP informs the trigger processor TRP that, in view of the selection performed during step 3, there are no derived context information depending on such a raw context information. On the other hand, if an update U of terrestrial coordinates is received, the derived context provider DCP informs the trigger processor TRP that, in view of the selection performed during step 3, the derived context information address depend on such raw context information.

Then, according to particularly advantageous embodiments of the present invention, the trigger processor TRP removes from the context database C-DB the stored values SV of the derived context information that depend on the raw context information whose update U has been received (step 7). This advantageously allows preventing that query conditions referring to attributes of such derived context information continue being considered fulfilled during the time period elapsing between reception of the update U and calculation of new values of such derived context information according to the update U.

For instance, according to the above exemplary context-based service, the identifiers of further users whose terminals are located in proximity of the terminal T should be provided to the terminal T while the terminal T is located in any city different from the city of residence of the user. If the user moves from one city to another city, the terrestrial coordinates detected by the terminal T change accordingly. The updates of the terrestrial coordinates are periodically sent to the context server SCtx. Upon reception of an update of the terrestrial coordinates, the trigger processor TRP invokes the derived context provider DCP, thus determining that the address at which the terminal T is located depends on the terrestrial coordinates, and accordingly deletes the stored address from the context database C-DB.

If the stored address were not deleted from the context database C-DB, the query condition Cq would be fulfilled even when the updated terrestrial coordinates indicate that the user is now located in his/her residence city, until the new address is calculated. The service application A would then continue notifying to the terminal T the identifiers of other users whose terminals are located in its proximity, even if the terminal T is now in his/her residence city. This situation would disadvantageously persist until a new address is calculated based on the updated terrestrial coordinates.

Preferably, both the updates U of the raw context information and the stored values SV of the derived context information stored in the context database C-DB have a predefined expiry time. The expire time of the stored values SV of the derived context information is determined by the derived context provider DCP. For instance, in the above exemplary context-based service, both the updates of terrestrial coordinates and the calculated values of the address may have an expiry time of e.g. 4 hours. When an update U of the raw context information is received at the context server SCtx, the stored values SV of the derived context information DS dependent therefrom are preferably deleted from the context database C-DB, even if the expiry time has not elapsed yet.

Then, the trigger processor TRP checks in the trigger database TR-DB whether a calculation trigger is active on the raw context information whose update U has been received (step 8).

If no calculation trigger is active on the raw context information whose update U has been received, the trigger processor TRP does not perform any other action. By referring to the above exemplary context-based service, this situation occurs for instance when an update of identifiers of Bluetooth devices detected by the Bluetooth interface of the terminal T is received at the context server SCtx. Since these raw context information have not been selected during step 3, no calculation trigger has been generated for them. Accordingly, upon reception of updates of the identifiers of detected Bluetooth devices, the context server SCtx advantageously does not perform any further action.

Otherwise, if at least one calculation trigger is active on the raw context information whose update U has been received, the trigger processor TRP reads in the context database C-DB the update U of the raw context information and transmits it to the derived context provider DCP. The derived context provider DCP in turn calculates according to the update U a new value NV of the derived context information dependent on such raw context information (step 9), and forwards it to the trigger processor TRP, that stores it in the context database C-DB (step 10).

The trigger processor TRP then checks in the trigger database TR-DB whether a query evaluation trigger is active on the derived context information whose new value NV has been calculated during step 9 (step 11).

In the negative, the trigger processor TRP does not perform any other action. Otherwise, if a query evaluation trigger is active on the derived context information whose new value NV has been calculated during step 9, the trigger processor TRP evaluates the query condition included in the active query evaluation trigger, by applying such a query condition to the new value NV of derived context information (step 12). By referring to the above exemplary context-based service, during step 11 the trigger processor determines that a query evaluation trigger is active on the derived context information address, and accordingly applies the query condition (i.e. current city different from residence city) to the city corresponding to the new address.

According to particularly preferred embodiments, before step 12, the trigger processor TRP may check whether the new value NV of the derived context information is equal to the stored value SV. In the affirmative, the trigger processor TRP determines that the derived context information still have the same value, and accordingly continues behaving as if the update U were not received. Otherwise, the trigger processor TRP performs the step 12 of applying the query condition to the new value NV of derived context information. This is particularly advantageous, since the query is evaluated only when the value of the derived context information actually changes, thus avoiding to repeat evaluation each time the received update U does not imply a change of value of the derived context information.

If the query condition is fulfilled, the context server SCtx takes the action specified by the query (step 13). Otherwise, the context server SCtx does not perform any action. Therefore, by referring to the above exemplary context-based service, if the current city calculated according to the updated address is different from the residence city of the user, the context server SCtx continues providing the service application A with the identifiers of users whose terminals are located in proximity of the terminal T. Otherwise, if the current city calculated according to the updated address is equal to the residence city of the users, the context server SCtx will not perform any further action.

Therefore, advantageously, the above disclosed method is capable of providing a context-based service suitable for adapting itself to one or more attributes of derived context information about the terminal. In particular, coordination between updates of raw context information received from the terminal, recalculation of derived context and evaluation of the query condition based on derived context information (or, rather, attributes thereof) is particularly efficient.

Indeed, thanks to generation of query evaluation triggers on the attributes and of calculation triggers on raw context information impacting on such attributes, upon reception of an update of raw context information the context server SCtx is capable of determining whether a new value of the derived context information must be calculated and, in the affirmative, of evaluating the query condition by applying it to the newly calculated value of the derived context information.

Therefore, advantageously, the derived context information are updated substantially in real time according to variations of the raw context information from which they depend.

Moreover, by generating calculation triggers only for raw context information whose variations possibly determine a variation of the attribute(s) referred to by the query condition (and not for all the raw context information impacting on the derived context information), a reduced number of calculation triggers is generated. This advantageously allows to calculate new values of the derived context information (and therefore to evaluate again the query condition) only when updates of raw context information likely to impact on the attributes referred to by the query condition are received at the context server. Therefore, advantageously, when updates of raw context information impacting on the derived context information, but whose variations are not likely to impact on the attribute(s) referred to by the query condition, are received at the context server, the derived context information are not calculated again. This advantageously allows to reduce the number of recalculation of new values of the derived context information.

Moreover, removing stored values of derived context information from the context database as soon as an update of related raw context information is received at the context server advantageously prevents the context server from evaluating the query condition by applying it to obsolete values of the derived context information, i.e. to values of the derived context information that are no more indicative of the actual context of the terminal. This advantageously allows preventing the context server from behaving differently from what prescribed by the query generated by the service application, thus avoiding malfunction of the context-based service.

The invention claimed is:

1. A method for providing a context-based service to a terminal of a communication network comprising, at a context server cooperating with said communication network:
   a) receiving a query from a service application capable of implementing said context based service, said query indicating that said context server should perform an action when a query condition is fulfilled, said query condition referring to one or more attributes of derived context information indicative of a context of said terminal;
   b) generating a query evaluation trigger indicating that said query condition should be evaluated when said derived context information is updated;
   c) identifying raw context information allowing derivation of said derived context information;
   d) generating a calculation trigger indicating that said derived context information should be calculated when an update of said raw context information is received from said terminal;
   e) receiving from said terminal an update of said raw context information and, according to said calculation trigger, calculating a new value of said derived context information according to said update; and
   f) according to said query evaluation trigger, evaluating said query condition by using said new value and, if said query condition is fulfilled, performing said action.

2. The method according to claim 1, wherein c) identifying raw context information, comprises identifying said raw context information as raw context information whose variation may determine a variation of said one or more attributes referred to by said query condition.

3. The method according to claim 1, wherein:
   c) identifying new context information, comprises identifying further raw context information to allow derivation of said derived context information; and
   d) receiving from said terminal an update, comprises generating a further calculation trigger indicating that said derived context information should be calculated also when an update of said further raw context information is received from said terminal.

4. The method according to claim 1, wherein e) receiving from said terminal, comprises, after calculating said new value of said derived context information, storing said new value in a context database cooperating with said context server, said context database also storing a previously stored value of said derived context information.

5. The method according to claim 4, wherein e) receiving from said terminal, further comprises comparing said new value with said stored value and, if said new value is equal to said stored value, deciding not to perform f) evaluating said query condition.

6. The method according to claim 4, wherein e) receiving from said terminal, further comprises removing said previously stored value of said derived context information from said context database upon reception of said update.

7. The method according to claim 4, wherein e) receiving from said terminal, further comprises removing said previously stored value of said derived context information from said context database upon expiration of an expiry time.

8. A context server for a communication network, said context server configured to provide a context-based service to a terminal of said communication network, comprising:
   a query processor configured to:
      a) receive a query from a service application capable of implementing said context based service, said query indicating that said context server should perform an action when a query condition is fulfilled, said query condition referring to one or more attributes of derived context information indicative of a context of said terminal;
      b) generate a query evaluation trigger indicating that said query condition should be evaluated when said derived context information is updated;
      c) identify raw context information allowing derivation of said derived context information; and
      d) generate a calculation trigger indicating that said derived context information should be calculated when an update of said part of said raw context information is received from said terminal; and
   a trigger processor configured to:
      e) receive from said terminal an update of said part of said raw context information and, according to said calculation trigger, calculate a new value of said derived context information according to said update; and
      f) according to said query evaluation trigger, evaluate said query condition by using said new value and, if said query condition is fulfilled, performing said action.

9. The context server according to claim 8, wherein said query processor is capable of being configured to identify said raw context information as raw context information, the variation of which may determine a variation of said one or more attributes referred to by said query condition.

10. The context server according to claim 8, wherein said query processor is configured to identify said part of said raw context information by invoking a derived context provider cooperating with said context server.

11. The context server according to claim 8, further comprising a context database storing a previously stored value of said derived context information, wherein said trigger processor is further configured to, after calculating said new value of said derived context information, store said new value in said context database.

12. The context server according to claim 11, wherein said trigger processor is further configured to compare said new value with said stored value and, if said new value is equal to said stored value, decide not to evaluate said query condition by using said new value.

13. The context server according to claim 11, wherein said trigger processor is further configured to remove said previously stored value of said derived context information from said context database upon reception of said update.

14. The context server according to claim 11, wherein said trigger processor is further configured to remove said previously stored value of said derived context information from said context database upon expiration of an expiry time.

15. A communication system comprising a communication network and a context server according to claim 8, cooperating with said communication network, said context server configured to provide a context-based service to a terminal of said communication network.

* * * * *